UNITED STATES PATENT OFFICE.

HENRY BLOUNT HUNTER, OF NORFOLK, VIRGINIA.

FOOD PRODUCT AND PROCESS OF MAKING THE SAME.

1,043,839.  Specification of Letters Patent.  Patented Nov. 12, 1912.

No Drawing.  Application filed December 14, 1911.  Serial No. 665,969.

*To all whom it may concern:*

Be it known that I, HENRY BLOUNT HUNTER, a citizen of the United States of America, residing at Norfolk, in the county of Norfolk and State of Virginia, have invented certain new and useful Improvements in Food Products and Processes for Making the Same, of which the following is a specification.

My invention relates more particularly to a food product and process for making the same from certain oleaginous and amylaceous seeds, which have a very high nutritive value; and to eliminate therefrom the indigestible and undesirable constituents without materially lowering the food value of any of the ingredients, and at the same time making a more palatable product than has heretofore been produced from these substances.

The particular object of this invention is to prepare a food product, having all the nutritive elements contained in the seeds of *Arachis hypogæa* and *Theobroma cacao*, except a part of the oil of *Theobroma cacao* to which there is objection, both on account of its indigestibility and because it is solid at ordinary temperatures,—the latter property interfering with its utility in certain food compounds. This product may be sweetened and otherwise flavored to suit varying requirements.

It is well known that the product made from *Theobroma cacao* which contains all the natural oil, and which is commonly called "chocolate" has a higher food value than the product from which the oil has been partially removed, and which is generally called "cocoa"; the number of calories per pound being, respectively, 2625 and 2150; but the objections to certain characteristics of oil of *Theobroma* (or cocoa butter) are so great that the use of cocoa has largely superseded that of chocolate, the more nutritious article.

In my invention I bring about the intimate admixture of that portion of the prepared seed of *Theobroma cacao*, which remains after a part of the oil has been separated, with the roasted and ground seed of *Arachis hypogæa*, which is commonly called "peanut butter"; which substance has a higher food value than chocolate,—the calories per pound being 2825. In order to bring about this intimate mixture of the ingredients and to render the product soluble and miscible with water, it is necessary that the amylaceous substances present shall be acted upon by heat and moisture at a temperature above 70 degrees C. and the fats present emulsified with same; the whole being made into a permanent emulsion, which can then be put up in any convenient form.

In preparing my food product, I take cocoa one part, nut butter two parts, sugar four parts, and water four parts. The cocoa is rubbed to a smooth paste with two parts of sugar and a small quantity of water, in a steam jacketed kettle and then more water is added until two parts of water are used. The nut butter is now added and the whole thoroughly mixed, after which the remainder of the water is added, steam is turned on and the mass is constantly stirred while being heated between 70 and 100 degrees C. until it is smooth and pasty. The steam is then cut off and the balance of the sugar added and the whole stirred until the sugar is dissolved and a smooth emulsion is obtained. The quantity of each of the ingredients may be varied somewhat, and the mixing may be carried out differently, but the use of heat above 70 degrees centigrade and the use of water is always necessary.

It will be observed that in this product, I have combined two of the most nutritious vegetable foods in such a manner as to render them more digestible and more acceptable to the palate than either alone. Beside this, the product is of such a nature that it produces with water a beverage having the qualities of a milk drink, but without the disadvantages of the same. It is produced at a much lower cost than a milk beverage of the same nutritive value, and offers a means of supplying a highly nutritious and easily digested liquid food at a lower cost than has heretofore been possible.

Having thus described my invention, what I claim as new, and desire to secure by Letters Patent, is:

1. The process of making a food product from commercial cocoa and an added fatty substance, which comprises the steps of adding moisture to said substances and subjecting the same to a temperature sufficient to convert the amylaceous bodies therein into substances which emulsify the oils present and render the product homogeneous and miscible with water.

2. The process of preparing a food product from commercial cocoa and peanut butter, which comprises the steps of adding water to said substances and subjecting the same to a temperature of 70° C. until the amylaceous bodies therein are converted into substances which emulsify the oils present.

3. The process of making a food product from the seed of *Theobroma cacao* from which a portion of the fatty substance has been removed, which comprises the steps of adding water to said cacao and reducing the mixture to a paste, adding thereto a fatty substance and more water, and heating the moist mixture to a temperature sufficient to convert the amylaceous contents into substances which emulsify the oils present.

4. The process of making a food product from the seed of *Theobroma cacao* from which a portion of the fat has been removed, which comprises the steps of producing a paste containing said substance, adding thereto a fatty substance of a different kind from that removed, and emulsifying the oils present.

5. The process of making a food product from the seed of *Theobroma cacao* from which a portion of the fat has been removed, which comprises the steps of producing a paste containing said substance, adding thereto a fatty substance consisting of a product of *Arachis hypogœa*, and heating the mixture to a temperature of above 70° C. until the oils present are emulsified.

6. The process of making a food product from cocoa and peanut butter, which comprises the steps of adding to the cocoa, sugar and water, reducing the same to a paste, adding thereto the peanut butter and more water, and heating the mixture to a temperature of above 70° C. until the amylaceous bodies therein are converted into substances which emulsify the oils present.

7. As an article of manufacture, a food product made from the seeds of *Theobroma cacao* and *Arachis hypogœa* in which the amylaceous contents have been converted into bodies which emulsify the oils present.

8. As an article of manufacture, a food product and beverage base containing commercial cocoa, peanut butter sugar and water, in which the oily contents of the oleaginous substances have been emulsified.

9. As an article of manufacture, a food product comprising an emulsion soluble and miscible in water at ordinary temperatures, and containing a product of the seeds of *Theobroma cacao*, and a fatty content consisting of a product of the seeds of *Arachis hypogœa*.

In testimony whereof I affix my signature in presence of two witnesses.

HENRY BLOUNT HUNTER.

Witnesses:
SAMUEL J. DEMAREST,
ROBERT L. HUNTER.